Sept. 20, 1960   W. H. ROBINSON, JR., ET AL   2,953,175
SAW BLADE HOLDER
Filed Aug. 26, 1959

INVENTORS
WALTER H. ROBINSON, JR.
ROBERT F. WEST
BY
Lindsey and Prutzman
ATTORNEYS

United States Patent Office 2,953,175
Patented Sept. 20, 1960

2,953,175

SAW BLADE HOLDER

Walter H. Robinson, Jr., West Hartford, and Robert F. West, Simsbury, Conn., assignors to The Stanley Works, New Britain, Conn., a corporation of Connecticut Filed Aug. 26, 1959, Ser. No. 836,131

8 Claims. (Cl. 145—31)

This invention relates to keyhole saws and the like and is concerned more particularly with a handle unit for such saws having a turret head for securing and positioning a replaceable saw blade therein.

It is an object of this invention to provide a saw blade holder wherein the blade may be positioned in a plurality of rotated angular positions with respect to the grip portion, and in which the blade is secured and positioned in the handle unit in an improved manner. Included in this object is the provision of such gripping means which will eliminate looseness between the blade and handle and which is simple and convenient to operate, thus facilitating removal and replacement of the blade.

Another object is to provide a saw blade holder of the type described which cannot be disassembled inadvertently.

A further object is to provide such a device which is economical to fabricate and assemble and which is rugged and durable so that it will not require repair or replacement over long periods of use.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims:

Figure 1:
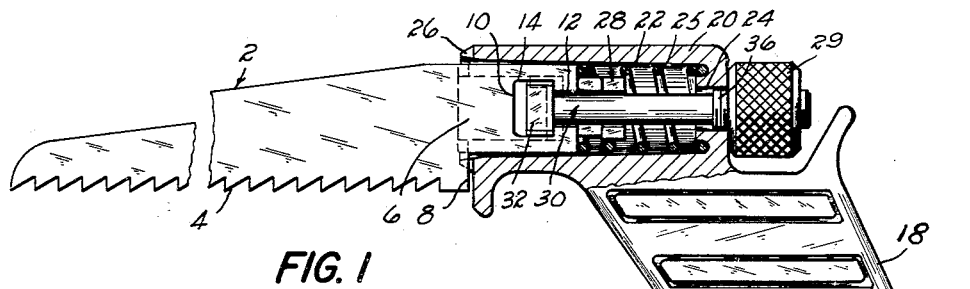
Fig. 1 is a side view of a completely assembled saw embodying the invention and with the cylinder wall of the handle unit in section and one of the holding jaws removed.

Referring to Fig. 1, a saw blade of the type utilized with the holder of the present invention is generally designated by the numeral 2, and has a toothed edge 4 extending from the shank 6 to the outer end of the blade. The shank 6 is of generally rectangular configuration and extends rearwardly from a lateral shoulder 8 which is parallel to the rear edge of the blade. A T-shaped aperture or slot 10 in the shank 6 forms a center slot 12 extending forwardly from the rear edge of the blade and a cross slot 14 spaced forwardly from the rear edge.

The blade holder comprises a pistol-type hand-grip 18 and an integral forwardly extending barrel or cylinder 20 having a cylindrical bore 22 in the forward portion thereof. A bore 24 of small diameter extends through the rear wall of the cylinder 20 coaxial with the bore 22. Spaced radially about the periphery of the front edge of the cylinder are a plurality of radial notches 26 for selectively receiving the shoulder 8 of the blade 2 depending upon the selected rotated position of the blade.

Slidably carried within the bore 22 are a pair of matched, interfitting chuck jaws 28 between which the shank 6 of the blade 2 is received. A T-bolt or T-lug 30 extends between the jaws 28 with its head 32 of generally rectangular cross section disposed between the jaws, and with its shank portion 36 extending rearwardly through the aperture 24. A compression spring 25 biases the jaws 28 forwardly and a knurled adjusting knob 29 is threadably engaged on the outer end of the T-bolt shank 36.

Figure 4:
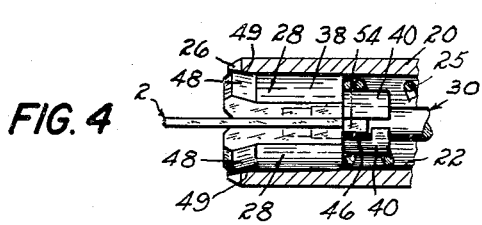
Fig. 4 is a fragmentary top view with the cylinder wall broken away to show the operative disposition of the parts when the blade and jaws are drawn into final locking position in the cylinder.
Figure 7:
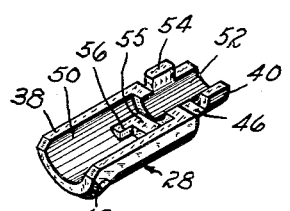
Fig. 7 is a perspective view of one of the holding jaws.

The jaws 28 are identical in construction, and the configuration and interlocking feature thereof are best illustrated by Figs. 4 and 7. Each jaw 28 is comprised of a semi-cylindrical body section 38 and a semi-cylindrical collar section 40 of reduced radius. As illustrated, one side edge of the collar 40 has a projecting lug 54 while the other side edge has a notch 46 so that two jaws, when assembled, interfit and are maintained in side-by-side alignment as shown in the drawings. The body section 38 has an outwardly flared edge portion 48 at its outer end which cooperates with the beveled edge 49 of the barrel 20 to cam the jaws together into blade clamping position when the jaws are drawn inwardly of the bore 22.

As best shown in Fig. 7, the inner surface of the body section 38 of the jaw defines a substantially semi-cylindrical recess 50, and a semi-cylindrical channel 52 of reduced radius extends rearwardly from the recess 50 through the collar section 40. The rear of the recess 50 is formed with a flat portion 55 having a leg or projection 56 at one edge thereof extending forwardly of the recess 50.

When the holder is assembled, the T-bolt 30 is disposed between the two jaws 28 with its shank 36 journaled in the mating channels 52 of the collar sections 40. The head 32 of the T-bolt, when the T-bolt is drawn rearwardly to the fullest extent, is seated between the opposed flat surfaces 55 and thus is prevented from turning relatively to the jaws 28. However, when the head 32 is moved forwardly, it may rotate relative to the jaws 28, but this turning movement is limited to 90° rotation by engagement of the head 32 with the legs 56.

Figure 2:
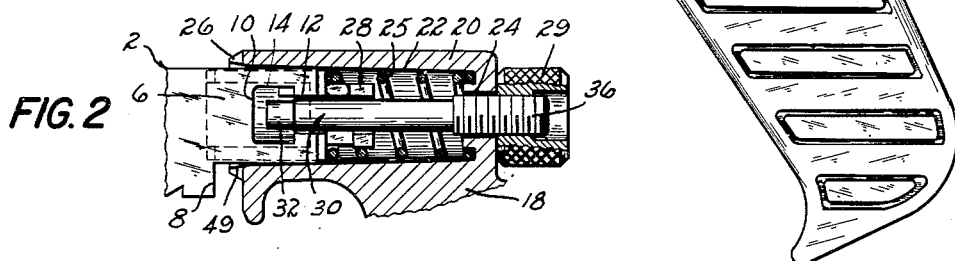
Fig. 2 is a fragmentary cross-sectional view of the cylinder portion shown in Fig. 1 showing the parts in initial position when a blade is inserted therein.
Figure 3:
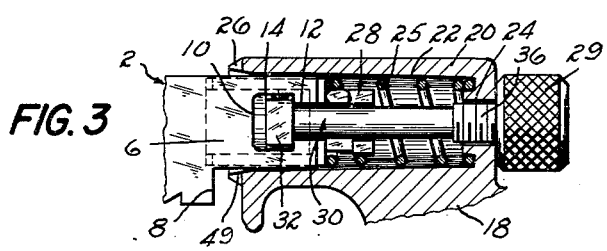
Fig. 3 is a view similar to Fig. 2 showing the parts in position following initial turning of the adjusting knob.
Figure 6:
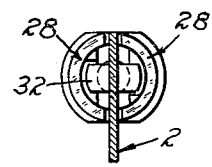
Fig. 6 is a front end view of the jaws and T-bolt with the saw blade in cross section, the parts being in the position shown in Figs. 1 and 4.
Figure 5:
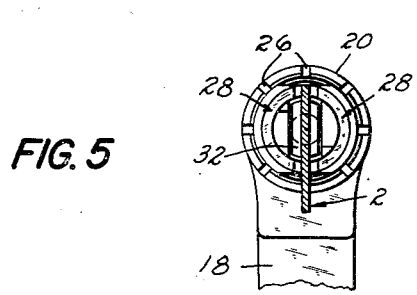
Fig. 5 is a fragmentary front end view of the saw with the saw blade in cross section and with the parts in the position shown in Fig. 4.

Referring now to the operation of the holder shown in the drawings, the adjusting knob 29 is backed off to permit the jaws 28 to move forwardly under the influence of spring 25 and to dispose the head 32 of the T-bolt 30 beyond the flat portion 56 of the jaws. The outer threads on the T-bolt are preferably multilated to prevent the knob 29 from being backed all the way off and becoming disengaged from the T-bolt 30. With the head of the T-bolt beyond the flats 55, the turning of the knob 29 through the friction of the threads will cause the T-bolt to turn in a clockwise direction, as viewed in Fig. 6, until stopped by the legs 56 which disposes the long axis of the T-bolt head 32 at right angles to the opening between the jaws, as shown in Figs. 2 and 6. The blade shank 6 is then inserted into the jaws and moved rearwardly, the T-bolt head 32 being acommodated by the center slot 12 of the blade aperture 10. After the blade shank 6 has been inserted, the knob 29 is then turned to tighten the assembly which first causes the T-bolt head 32 to be rotated 90° into alignment with the flats 55 and positions the long axis of the T-bolt head parallel to the blade and engages the head in the cross slot 14 as shown in Figs. 3–5. By continued rotation of the adjusting knob 29, the T-bolt 30 is drawn rearwardly, first pulling the end of the blade into engagement with the lugs 54, and by reason of this engagement, then moving the jaws 28 and blade inwardly of the cylinder bore 22. As best shown in Fig. 1 of the drawings, the T-bolt does not pull directly on the jaws, but effects rearward movement thereof only through the blade 2, thus assuring that the blade will always be fully inserted into the jaws. As the jaws are moved inwardly to the fullest extent, the tapered portions 48 engage the sides of the cylinder bore 22 and the jaws 28 are cammed into firm clamping engagement with the blade shank 6, as best shown in Fig. 4. At the same time, the shoulder 8 of the blade enters one of the axial slots 26 spaced about the periphery of the cylinder to lock the blade 2 in selected radial position.

To release the blade, the adjusting knob 29 is merely backed off as previously described to permit the T-bolt and jaws to move forwardly which releases the clamping action of the jaws and permits the head of the T-bolt to turn into alignment with the center slot 12, as shown in Fig. 3, whereupon the blade may be withdrawn.

The holder of the present invention has been found to eliminate all looseness as a result of the side-gripping of the jaws, while at the same time assuring that the blade will be fully inserted into the jaws. The arrangement provided by the jaws for positioning the T-bolt for release or engagement with the blade when the knob is turned renders the tool convenient and easy to use because the gripping action requires only the rotation of the adjusting knob and does not require disassembly of the holder. The tool is economical to fabricate and assemble and is durable and rugged in construction for trouble-free operation over long periods of use.

Although but one embodiment of the invention has been illustrated and described, it will be readily apparent that modifications may be made without departing from the scope and spirit of the invention and such modifications are intended to be included within the scope of the invention.

We claim:

1. In a handle unit for a saw blade of the type having a T-shaped slot extending forwardly from the rear edge thereof, a tubular housing, a T-shaped bolt extending into the housing from the rear end thereof and having a transversely elongated head for engagement in the slot of a blade, a pair of side-by-side jaws in the housing having opposed surfaces for engaging a blade therebetween, said surfaces being recessed to accommodate the head of the bolt, an abutment on the jaws for engagement by the rear edge of a blade to limit movement of the blade rearwardly relative to the jaws, an adjusting nut threadably mounted on the end of the bolt to draw the bolt rearwardly of the housing, and a camming surface on the jaws engageable with the housing to cam the jaws into clamping engagement with a blade when the jaws are moved rearwardly relative to the housing.

2. In a handle unit for a saw blade of the type having a T-shaped slot extending forwardly from the rear edge thereof, a tubular housing, a T-shaped bolt extending into the housing from the rear end thereof and having a transversely elongated head for engagement in the slot of a blade, a pair of side-by-side jaws in the housing having opposed surfaces for engaging a blade therebetween, said surfaces being recessed to accommodate the head of the bolt, a lug at the rear portion of one jaw extending into an aperture in the second jaw for retaining the jaws in axial alignment and forming an abutment for the rear edge of a blade disposed between the jaws, an adjusting nut threadably mounted on the end of the bolt to draw the bolt rearwardly of the housing, a spring urging the jaws forwardly of the housing, and a camming surface on the jaws engageable with the housing when the jaws are drawn into the housing to cam the jaws into the clamping engagement with a blade disposed therebetween.

3. A handle unit for use with a saw blade of the type having a T-shaped slot extending forwardly from the rear edge thereof, a tubular housing, a pair of jaws slidably mounted in the housing and adapted to clamp the end of a saw blade therebetween, said jaws being recessed to form a central cavity therebetween, a T-shaped bolt extending through the rear of the housing and having a transversely elongated head disposed in the cavity between the jaws, said head being slidable into and out of the slot of a blade disposed in the jaws when the head is in one rotated position relative to the jaws and being engageable in the slot in a second rotated position relative to the jaws, means at the rear portion of the jaws for retaining the head of the bolt in said second rotated position, means forwardly of the last-named means permitting limited rotational movement of the bolt head to said first rotated position, an adjusting nut threadably mounted on the end of the bolt to draw it rearwardly of the housing, means on the jaws for engagement by the rear edge of a blade disposed between the jaws, and a camming surface on the jaws engageable with the housing as the jaws are moved rearwardly of the housing for camming the jaws together into blade clamping position.

4. A handle unit for use with a saw blade of the type having a T-shaped slot extending forwardly from the rear edge thereof, a tubular housing, a pair of jaws slidably mounted in the housing and having opposed surfaces adapted to clamp the end of a saw blade therebetween, said jaws being recessed to form a central cavity therebetween, a T-shaped bolt extending through the rear of the housing and having a transversely elongated head disposed in the cavity between the jaws, said head being slidable into and out of the slot of a blade when in a first rotated position with its longest side at right angles to said opposed surfaces of the jaws and being engageable in the slot when turned to a second rotated position with its longest side parallel to said opposed surfaces, an adjusting nut threadably engaged on the end of the bolt to draw the bolt rearwardly of the housing, a pair of diametrically opposed flat portions at the rear of each jaw for receiving and retaining the head of the bolt therebetween in said second rotated position, a projection forwardly from one end of each flat portion forming stops limiting rotational movement of the head from said second rotated position to the said first rotated position, a shoulder on at least one of the jaws extending transversely between the blades for engagement by the end of a blade drawn rearwardly by the bolt, and a camming surface on the jaws engageable with the housing to cam the jaws together as the jaws are drawn rearwardly of the housing.

5. The combination comprising a saw blade of the type having an aperture in its shank portion forming a slot extending forwardly from the rear edge and providing an inner transverse edge spaced forwardly of the rear edge, and a handle unit comprising a tubular housing a pair of jaws axially slidable in the housing and adapted to clamp the shank portion of the saw blade therebetween, said jaws having a transverse shoulder adjacent the rear end thereof for engagement by the rear edge of the blade, a T-shaped bolt extending through the rear of the housing and having a transversely elongated head disposed between the jaws, said head being dimensioned to enter the slot of the blade in a first rotated position of the head relative to the jaws and to engage said transverse edge of the blade in a second rotated position of the head relative to the jaws, an adjusting nut threadably mounted on the end of the bolt to draw the bolt inwardly of the housing whereby when the bolt head is engaged with the transverse edge of the the blade, the end of the blade will be drawn into engagement with the transverse shoulder of the jaws and the blade and jaws will be drawn into the housing together, a flared camming surface on the forward portion of the jaws for engagement with the housing to cam the jaws together when the jaws are drawn into the housing, opposed surfaces at the rear portion of the jaws for receiving and retaining the head of the bolt in said second rotated position, and abutments forwardly of said surfaces permitting limited rotation of the bolt head to said first rotated position.

6. The combination comprising a saw blade of the type having a T-shaped aperture in its shank portion forming a slot extending forwardly from the rear edge and providing an inner transverse edge spaced forwardly of the rear edge, and a handle unit comprising a tubular housing, a pair of jaws axially slidable in the housing and adapted to clamp the shank portion of the saw blade therebetween, said jaws being recessed at their forward end and having projecting lugs adjacent the rear end thereof for engagement by the rear edge of the blade, a T-shaped bolt extending through the rear of the housing and having a transversely elongated head disposed in the recess between the jaws, said head being dimensioned to enter the slot of the blade in a first rotated position of the head relative to the jaws and to engage said transverse edge of the blade in a second rotated position of the head relative to the jaws, an adjusting nut threadably mounted on the end of the bolt to draw the bolt inwardly of the housing whereby when the bolt head is engaged with the transverse edge of the blade, the end of the blade will be drawn into engagement with the projecting lugs of the jaws and the blade and jaws will be drawn into the housing together, a flared camming surface on the forward portion of the jaws for engagement with the housing to cam the jaws together when the jaws are drawn into the housing, opposed surfaces at the rear of the recess of the jaws for receiving and retaining the head of the bolt in said second rotated position, and abutments forwardly of said surfaces permitting limited rotation of the bolt head to said first rotated position.

7. The combination comprising a saw blade of the type having an aperture in its shank portion forming a slot extending forwardly from the rear edge and providing an inner transverse edge spaced forwardly of the rear edge, and a handle unit comprising a handgrip provided with a forwardly opening tubular housing, a pair of jaws axially slidable in the housing and adapted to clamp the shank portion of the saw blade therebetween, said jaws being recessed at their forward end having a transverse shoulder adjacent the rear end thereof for engagement by the rear edge of the blade, a spring urging the jaws forwardly of the housing, a T-shaped bolt extending through the rear of the housing and having a transversely elongated head disposed between the jaws, said head being dimensioned to enter the slot of the blade in a first rotated position of the head relative to the jaws with the longer dimension of the head perpendicular to the jaws and to engage said transverse edge of the blade in a second rotated position of the head relative to the jaws with the longer dimension of the head parallel to the jaws, an adjusting nut threadably mounted on the end of the bolt to draw the bolt inwardly of the housing whereby when the bolt head is engaged with the transverse edge of the blade, the end of the blade will be drawn into engagement with the transverse shoulder of the jaws and the blade and jaws will be drawn into the housing together, a flared camming surface on the forward portion of the jaws for engagement with the housing to cam the jaws together when the jaws are drawn into the housing, opposed surfaces at the rear portion of the jaws for receiving and retaining the head of the bolt in said second rotated position, and abutments forwardly of said surfaces permitting limited rotation of the bolt head to said first rotated position.

8. The combination comprising a saw blade of the type having a shank portion formed with a transverse shoulder and having a T-shaped aperture in its shank portion forming a slot extending forwardly from the rear edge and providing an inner transverse edge spaced forwardly of the rear edge, and a handle unit comprising a tubular housing having radial notches in its forward edge for engagement selectively by the transverse shoulder of the blade, a pair of jaws rotatable and axially slidable in the housing and adapted to clamp the shank portion of the saw blade therebetween, each of said jaws having a recess at its forward end and a projecting lug adjacent the rear end thereof, said lugs being engageable by the rear edge of the blade, a spring urging the jaws forwardly of the housing, a T-shaped bolt extending through the rear of the housing and having a transversely elongated head disposed between the jaws, said head being dimensioned to enter the slot of the blade in a first rotated position of the head relative to the jaws and to engage said transverse edge of the blade in a second rotated position of the head relative to the jaws, an adjusting nut threadably mounted on the end of the bolt to draw the bolt inwardly of the housing whereby when the bolt head is engaged with the transverse edge of the blade, the end of the blade will be drawn into engagement with the lugs of the jaws and the blade and jaws will be drawn into the housing together, a flared camming surface on the forward portion of the jaws for engagement with the housing to cam the jaws together when the jaws are drawn into the housing, opposed surfaces at the rear portion of the jaws for receiving and retaining the head of the bolt in said second rotated position, and abutments forwardly of said surfaces permitting limited rotation of the bolt head to said first rotated position.

References Cited in the file of this patent

UNITED STATES PATENTS

| | | |
|---|---|---|
| 1,583,967 | Epps | May 11, 1926 |
| 2,621,689 | Fordan | Dec. 16, 1952 |
| 2,696,233 | Huxtable | Dec. 7, 1954 |
| 2,773,528 | Gringer | Dec. 11, 1956 |

FOREIGN PATENTS

| | | |
|---|---|---|
| 311,193 | Germany | Feb. 28, 1919 |
| 81,838 | Norway | May 26, 1953 |